May 18, 1926. 1,584,816

L. SIMEONOFF

VEHICLE WHEEL DRIVE CONSTRUCTION

Filed Oct. 19, 1923

Inventor

Louis Simeonoff,

Attorneys

Patented May 18, 1926.

1,584,816

UNITED STATES PATENT OFFICE.

LOUIS SIMEONOFF, OF DETROIT, MICHIGAN.

VEHICLE WHEEL DRIVE CONSTRUCTION.

Application filed October 19, 1923. Serial No. 669,476.

This invention relates to vehicle wheel construction, and the primary object of my invention is to arrange a load sustaining wheel or element in a driven ground engaging wheel with the former bearing on the latter so that there will be a rolling contact between the two wheels and thus permit of the ground engaging wheel being driven with a minimum expenditure of power.

Another object of my invention is to furnish the load sustaining wheel of a vehicle with a movable tread member which is driven to at all times present a smooth and uninterrupted supporting surface for the load sustaining wheel and to a certain extent reduce the jarring and vibrating incident to a load sustaining wheel passing over an irregular surface.

A further object of my invention is to provide novel bearings for supporting a load relative to a driven axle or element, the bearings having a recessed rolling contact relative to the axle or element which is in contradistinction to bushing, bearing sleeves and such journal boxes where a driven bearing revolves against a stationary bearing.

A still further object of my invention is to provide strong, durable and inexpensive driven vehicle wheel in which may be placed a load sustaining element and the construction of the wheel lends itself to heavy vehicular traffic, particularly large trucks requiring wide wheels and solid tires.

The above are a few of the objects attained by my invention and others will appear as the construction is better understood by aid of the drawings, wherein—

Figures 1, 2, 3:
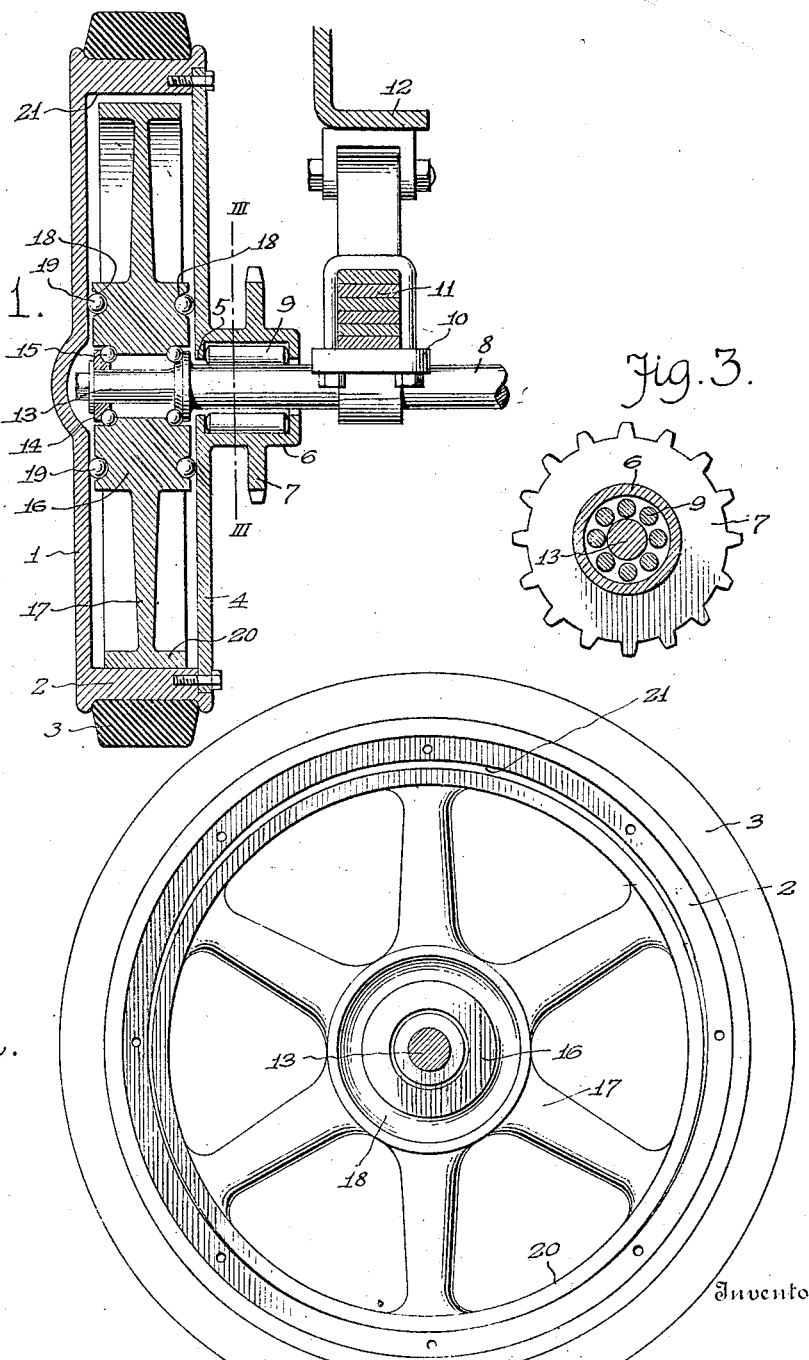
Figure 1 is a vertical cross sectional view of a vehicle wheel drive construction in accordance with my invention.
Fig. 2 is an elevation of the inner side of the wheel with the cover thereof removed, showing the load sustaining wheel.
Fig. 3 is a cross sectional view taken on the line III—III of Fig. 1.

In the drawing, the reference numeral 1 denotes a ground engaging wheel that may have the rim 2 thereof provided with a tire 3. The ground engaging wheel is preferably in the form of a cylindrical drum or hollow body having an outer integral wall and a detachable inner wall or side plate 4 suitably secured to the rim 2 of the wheel, so that easy access may be had to the interior of the wheel.

Concentric of the side plate 4 is an axle opening 5 and projecting outwardly from said side plate co-axially of the opening 5 is a cylindrical bearing housing 6 having its periphery provided with a power transmission wheel 7 which may be in the form of a sprocket wheel integral with the housing 6.

Extending through the housing 6 and the opening 5 into the ground engaging wheel 1 is an axle 8 and in the housing 6 are antifrictional roller bearings 9 that may be engaged by the axle 8. On the axle 8 adjacent the housing 6 is a spring perch 10 for a spring 11 adapted for supporting a vehicle frame 12, chassis, body or other load carrying structure.

On the outer end of the axle 8, in the ground engaging wheel 1, is a spindle 13 provided with inner races 14 for anti-frictional ball bearings 15 supported by the hub 16 of a load carrying wheel 17. The sides of the hub 16 have annular races 18 for anti-frictional bearings 19 engaging adjacent inner faces of the side walls of the ground engaging wheel 1.

The load sustaining wheel 17 has a smooth rim or tire 20 adapted to roll on the inner wall 21 of the rim 2, at the lower side of the ground engaging wheel, and with power applied to said ground engaging wheel, through the medium of the sprocket wheel 7 or some other power connection, the ground engaging wheel will be driven and cause the load sustaining wheel to roll on the ground engaging wheel as an uninterrupted path for said load sustaining wheel.

What I claim is:—

In a motor driven vehicle wherein power is applied to a wheel, a stationary axle, a hub on the outer end of said axle, a wheel rim carried by said hub, a hollow closed drum enclosing said hub and wheel rim, said drum having its inner annular wall engaged by said wheel rim, anti-frictional bearings between the ends of said hub and the side walls of said drum, a bearing housing carried by the inner side wall of said drum, anti-frictional bearings in said housing about said stationary axle, and a power transmission wheel forming part of said bearing housing.

In testimony whereof I affix my signature.

LOUIS SIMEONOFF.